No. 785,300. Patented March 21, 1905.

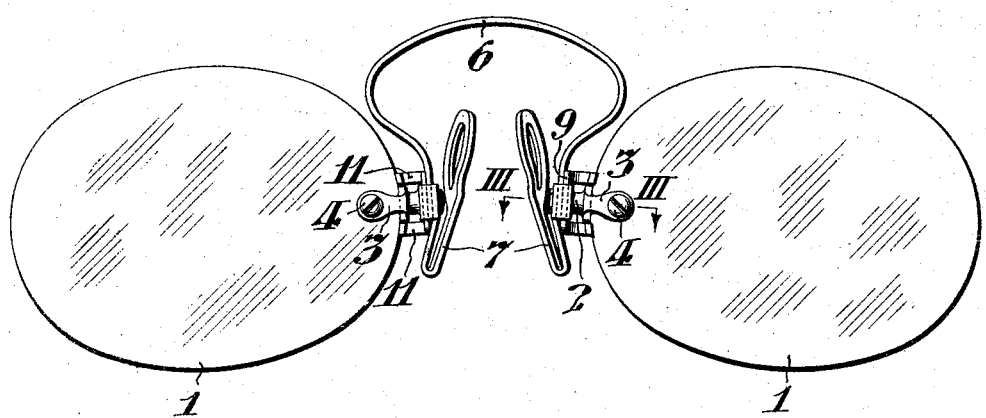
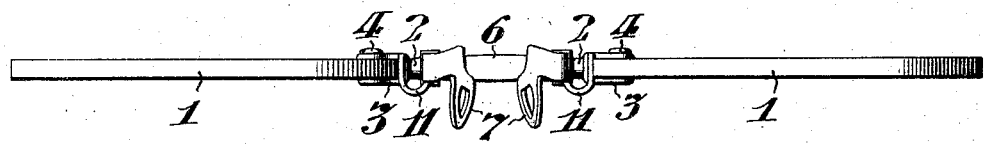
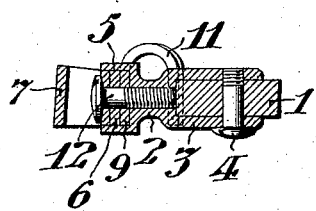
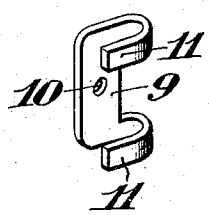
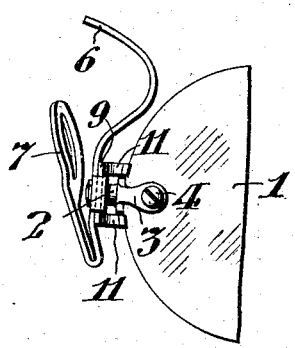

UNITED STATES PATENT OFFICE.

IVAN FOX, OF PHILADELPHIA, PENNSYLVANIA, ASSIGNOR TO FOX OPTICAL MANUFACTURING COMPANY, OF PHILADELPHIA, PENNSYLVANIA, A CORPORATION OF NEW JERSEY.

EYEGLASS-MOUNTING.

SPECIFICATION forming part of Letters Patent No. 785,300, dated March 21, 1905.

Application filed December 27, 1904. Serial No. 238,351.

*To all whom it may concern:*

Be it known that I, IVAN FOX, a citizen of the United States, residing in the city and county of Philadelphia, State of Pennsylvania, have invented certain new and useful Improvements in Eyeglass-Mountings, of which the following is a specification.

My invention relates to an improvement in eye glass mountings, and especially mountings of that character which are adapted to be used in connection with rimless lenses.

The principal object of my invention is to provide means to prevent relative movement between the lens and the particular portion of the mounting to which it is secured.

By the use of my invention, I am enabled to dispense with the stays which are usually provided upon opposite sides of the posts or standards of a pair of eye glasses, and which lie in the plane of the lenses and in contact with the edges thereof upon opposite sides of the respective posts or standards.

It is found that in order to prevent relative movement between a lens and the screw or other fastening, by means of which it is secured to the eye glass mounting, it is necessary that the stays exert an undue amount of pressure upon such lens, which pressure frequently occasions fracture of the lens by which it is destroyed.

By the use of my invention or improvement, this objectionable feature or difficulty is avoided.

In the drawings which accompany and form a part of this specification, I have illustrated a convenient embodiment of my invention, and it will be understood that various changes may be made without departing from the scope of my invention.

In the drawings,

Figure I is a front elevation of a pair of eye glasses provided with my invention;

Figure II is a bottom plan view of a pair of eye glasses provided with my invention;

Figure III is a section on the line III-III of Figure I;

Figure IV is a perspective view of the device embodying my invention; and

Figure V is the front elevation of a portion of a pair of eye glasses showing a modified construction of my invention.

In the drawings,—

1 designates the lenses of a pair of eye glasses to which posts or standards 2 are connected by means of the straps 3 and screws 4, the latter extending through the straps and the said lenses in the usual manner. The posts or standards are provided with grooves 5 upon their inner ends within which the ends of the bow spring 6 are respectively located. 7 designates nose guards, the arms of which are located in the grooves 5 formed in the inner ends of the posts or standards 2.

In order to prevent movement of the lenses with respect to the screws 4, straps 3, and posts or standards 2; that is, in order to prevent movement of the lenses about the screw 4 as a pivot, I have provided the device shown most clearly in Figure IV, which consists of a plate or bar 9 provided with a perforation 10, the said plate or bar being provided with pliable or bendable and resilient springs 11, which, as illustrated, are of U-shape, though such shape or contour of the springs may be altered, if desired.

The plate or bar 9 of this device is adapted to be seated within the groove of a post or standard, preferably upon the bottom thereof, though, if desired, it may be located between the end of the bow spring and the arm of the guard; or it may be located upon the outside, that is, upon the end of the bow spring and the arm of the guard, if found desirable.

After the plate or bar 9, the end of the bow spring, and the upper end of the arm of the guard are placed in a groove 5 of a post or standard, they are firmly secured therein by means of a screw 12 or in any other desired manner.

It will be observed upon inspection of the drawings that the U-shaped springs 11 are arranged in planes which are substantially at right angles to the length of the plate or bar 9, and that when the said plate or bar is secured in position and connected to the post or standard, the said U-shaped springs occupy planes which are substantially at right angles to the plane of the lenses of a pair of eye glasses.

In order that the U-shaped springs 11 may rest flat upon the edges of the lenses, the outer ends of the said springs are inclined or slightly twisted in the manner indicated most clearly in Figures I and V.

The construction shown in Figure V is identical with that shown in the preceding figures of the drawing, except that the bow spring is formed integral with the nose pieces or nose guards, as is clearly shown.

It is well known that the lenses of eye glasses expand and contract as a result of the changes of temperature, and it is obvious that some means should be provided for the purpose of permitting such expansion and contraction without danger of fracturing the lenses, and which will at the same time exert sufficient pressure upon the lenses upon opposite sides of their points of connection with the mounting to prevent relative movement between the lenses and the means by which they are connected to the mounting.

This purpose is accomplished by my invention, as it is obvious that the U-shaped springs 11 will yield to the pressure occasioned by the expansion of the lenses, and upon contraction of the lenses the springs will simultaneously expand, that is, will resume the position which they occupied prior to the expansion of the lenses and will continue to exert sufficient pressure upon the lenses to prevent relative movement of the same with respect to the screws or other devices by means of which they are connected to the lenses.

Although the nose pieces or nose guards which I have illustrated have the same construction as the nose guard forming the subject-matter of my patent No. 695,681, dated March 18, 1902, it is to be understood that a guard of any other suitable construction may be employed.

Having thus described my invention, I claim—

1. In eye glasses, the combination of a lens, a bow spring, a post or standard connective of the lens and the bow spring, a nose piece or nose guard connected to the said post or standard, and a U-shaped spring located to one side of the said post or standard, the said spring being arranged at right angles to the plane of the lens and adapted to contact with the edge of the said lens.

2. In eye glasses, the combination of lenses, a bow spring, posts or standards connected to the said bow spring and to the said lenses, nose pieces or nose guards connected to the said posts or standards, and U-shaped springs located upon opposite sides of the said posts or standards and adapted to contact with the said lenses.

3. In eye glasses, the combination of lenses, a bow spring, posts or standards, means connecting the said posts or standards and the said lenses, nose pieces or nose guards connected to the said posts or standards and to the said bow spring and U-shaped springs located upon opposite sides of the said posts or standards and adapted to contact with the said lenses, the said springs being respectively arranged at right angles to the plane of the said lenses.

4. In eye glasses, the combination of a lens, a bow spring, a post or standard, means for connecting the said lens to the said post or standard, a nose piece connected to the said post or standard, a device for preventing relative movement between the lens and the means by which it is secured to the said post or standard, the said device comprising a plate or bar which is secured to the post or standard and which is provided with U-shaped springs upon its opposite ends which are adapted to contact with the said lens.

5. In eye glasses, the combination of a lens, a post or standard secured to the said lens and provided with a groove in its inner end, a bow spring having an end located in the said groove, a nose piece or nose guard having its arm located in the said groove, and a device for preventing relative movement between the post or standard and the said lens, the said device consisting of a plate or bar which is also located in the said groove, the said plate or bar being provided with U-shaped springs at its opposite ends, which springs are arranged in planes transverse to the plane of the said lens and are adapted to contact with the said lens, and means for securing the bow spring, nose piece or nose guard and plate or bar within the said groove.

6. In eye glasses, the combination of a lens, a post or standard secured to the said lens and provided with a groove in its inner end, a bow spring having one end located in the said groove, a nose piece or nose guard formed integral with the said bow spring, and means for securing the said bow-spring and nose piece or nose guard to the said post or standard, and U-shaped springs arranged in planes transverse to the plane of the lens and located upon opposite sides of the said post or standard and adapted to contact with the said lens.

7. As an article of manufacture, a device adapted to prevent relative movement between a lens of a pair of eye glasses and the post or standard connecting the said lens and the bow spring, the said device consisting of a plate or bar provided at its opposite ends with U-shaped springs.

8. As an article of manufacture, a device adapted to prevent relative movement between a lens of a pair of eye glasses and the post or standard connecting the said lens to the bow spring, the said device consisting of a plate or bar provided at its opposite ends with U-shaped springs, which springs are arranged in planes extending transversely of the said plate or bar.

In testimony that I claim the foregoing as my invention I have hereunto signed my name this 23d day of December, A. D. 1904.

IVAN FOX.

In presence of—
   THOS. K. LANCASTER,
   LAURA KLEINFELDER.